(12) United States Patent
Thorpe

(10) Patent No.: US 11,738,871 B2
(45) Date of Patent: Aug. 29, 2023

(54) RETRACTABLE TACTILE INTERFACE

(71) Applicant: SAFRAN ELECTRONICS & DEFENSE COCKPIT SOLUTIONS, Montreuil (FR)

(72) Inventor: Thomas Thorpe, Montreuil (FR)

(73) Assignee: Safran Electronics & Defense Cockpit Solutions, Montreuil (FR)

( * ) Notice: Subject to any disclaimer, the term of this patent is extended or adjusted under 35 U.S.C. 154(b) by 65 days.

(21) Appl. No.: 17/625,675

(22) PCT Filed: Jul. 9, 2020

(86) PCT No.: PCT/EP2020/069404
§ 371 (c)(1),
(2) Date: Jan. 7, 2022

(87) PCT Pub. No.: WO2021/005166
PCT Pub. Date: Jan. 14, 2021

(65) Prior Publication Data
US 2022/0276743 A1 Sep. 1, 2022

(30) Foreign Application Priority Data
Jul. 9, 2019 (FR) ...................................... 1907682

(51) Int. Cl.
*B64D 11/00* (2006.01)
*G06F 3/044* (2006.01)
(Continued)

(52) U.S. Cl.
CPC ........ *B64D 11/00155* (2014.12); *B60N 2/797* (2018.02); *B64D 11/0689* (2013.01);
(Continued)

(58) Field of Classification Search
CPC .............. G06F 3/041; B64D 11/00155; B64D 11/0689; B60K 2370/1434; B60K 2370/1438; B60K 37/06; B60K 35/00; B60N 2/797; B60N 2/20; B60N 2/773; B60N 2/767
See application file for complete search history.

(56) References Cited

U.S. PATENT DOCUMENTS 10,273,009 B2 * 4/2019 Fishel ................ B64D 11/0638
10,744,918 B2 * 8/2020 Mullen .................. B60N 2/793
(Continued)

FOREIGN PATENT DOCUMENTS

DE 102014016323 B4 * 11/2021 ............. B60K 35/00
EP 3147761 A1 * 3/2017 ........... G06F 1/1652
(Continued)

*Primary Examiner* — Darlene M Ritchie
(74) *Attorney, Agent, or Firm* — CHRISTENSEN O'CONNOR JOHNSON KINDNESS PLLC

(57) ABSTRACT

A tactile interface including a touch pad and a support, the touch pad being hingedly attached to the support between the extended active position and a retracted inactive position, in which the pad is folded back towards the support wherein the support constitutes a drawer which is movable in a casing between a pulled-out position in which the interface is in the active position and an inserted position in which the interface is in the retracted position.

9 Claims, 3 Drawing Sheets

(51) Int. Cl.
*B64D 11/06* (2006.01)
*G06F 3/041* (2006.01)
*B60N 2/75* (2018.01)

(52) U.S. Cl.
CPC ............ *G06F 3/041* (2013.01); *G06F 3/0446* (2019.05); *B60K 2370/1434* (2019.05)

(56) References Cited

U.S. PATENT DOCUMENTS

2016/0375924 A1* 12/2016 Bodtker .............. B60R 11/0252
74/552
2019/0077288 A1* 3/2019 Gayon ................... B60N 2/797
2019/0184877 A1* 6/2019 Gomez ................... B60N 2/20
2019/0275919 A1* 9/2019 Gayon ................... B60N 2/797

FOREIGN PATENT DOCUMENTS

EP 3339078 B1 * 12/2020 ............. B60K 35/00
FR 3096804 A1 * 12/2020 ........... G06F 3/0446

* cited by examiner

[Fig 1]
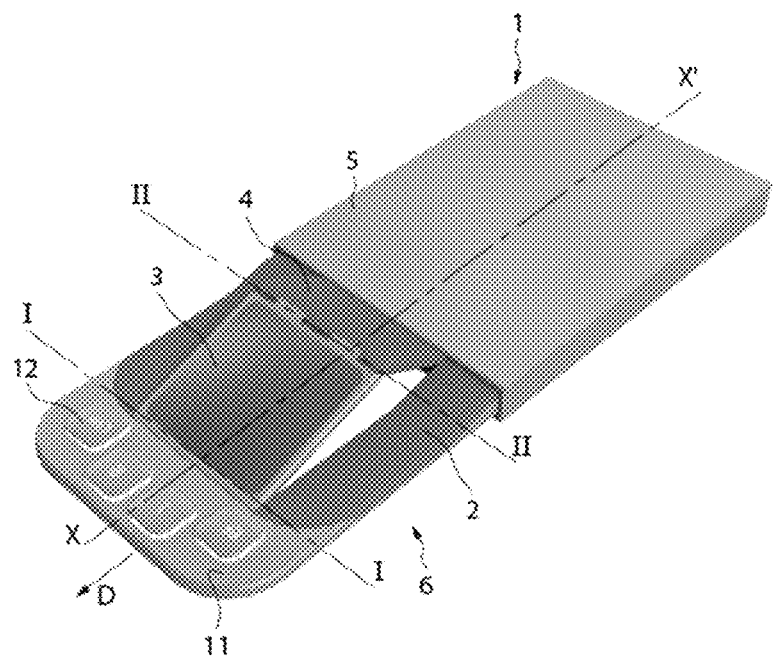
[Fig 2]
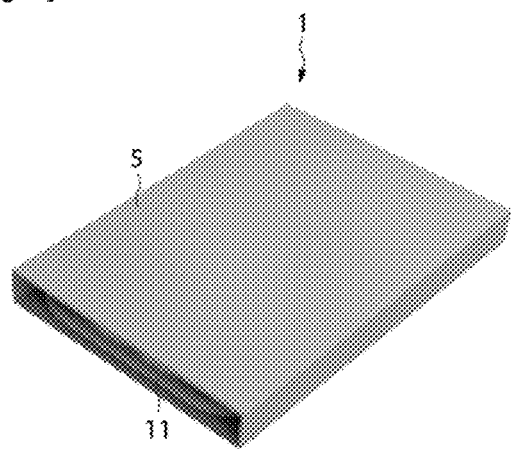

[Fig 3]
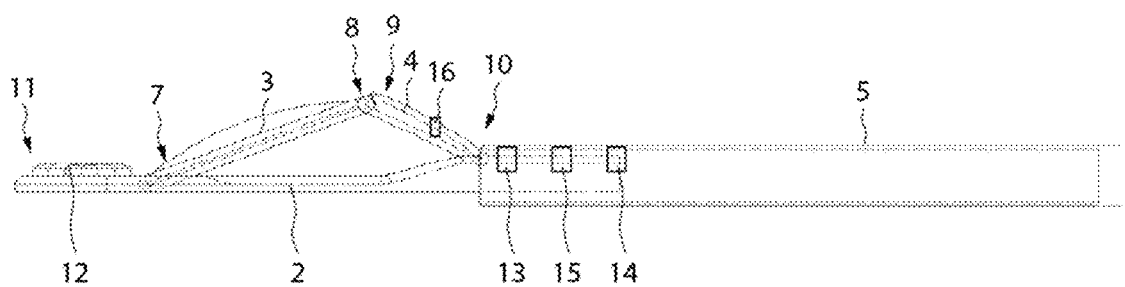
[Fig 4]
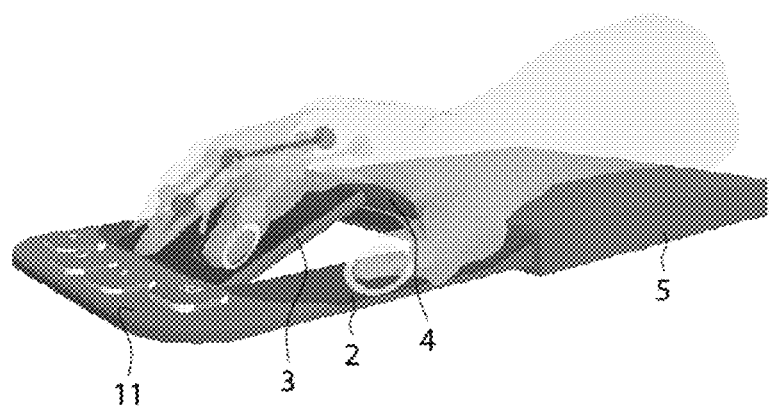

[Fig 5]
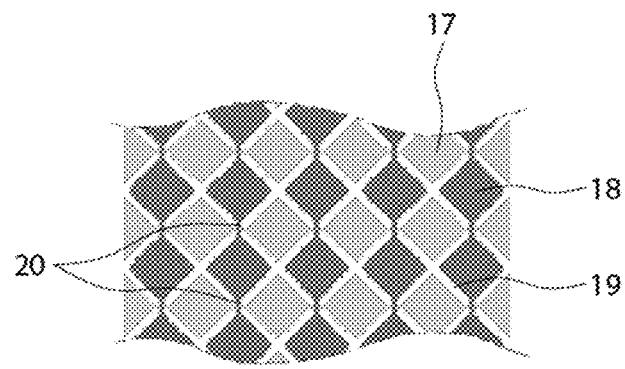
[Fig 6]
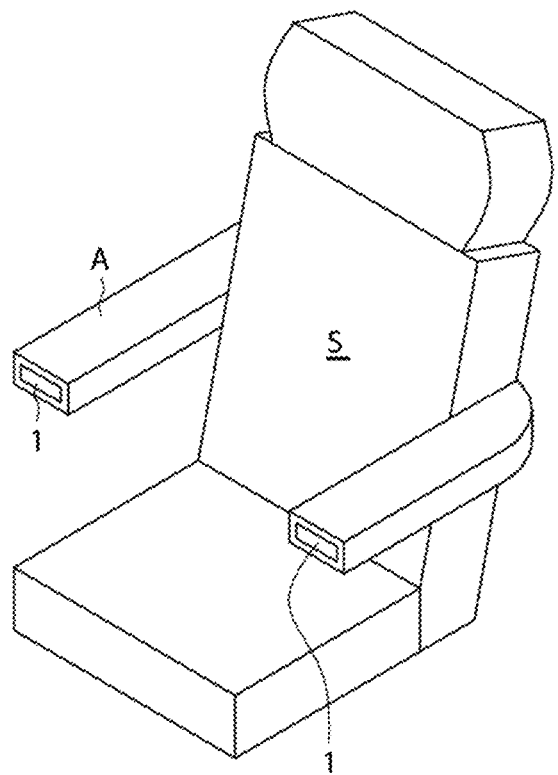

RETRACTABLE TACTILE INTERFACE

CROSS-REFERENCES TO RELATED APPLICATIONS

This application is a National Stage of International Application No. PCT/EP2020/069404 filed Jul. 9, 2020, which claims priority to French Patent Application No. 1907682, filed Jul. 9, 2019, the entire disclosures of which are hereby incorporated by reference.

TECHNICAL FIELD

The present invention relates, in general, to tactile control interfaces, and more particularly relates to tactile control interfaces intended to be on board aircraft and to be manipulated for the implementation of avionics functions or, in general, to control or monitor the operation of on-board equipment.

However, the invention also applies to any other field in which the tactile interfaces are used in an environment subjected to vibrations or, in general, to disturbances likely to cause discomfort to the user and increase the risks of handling errors.

PRIOR ART

In the first place, regardless of the type of interface, even in the case of actuating a control button, the user's hand may be subject to tremors, or to errors in the assessment of the position of the area to be actuated. The ergonomics of the interfaces is therefore one of the major concerns of the designers of the interfaces for aircrafts.

These ergonomic problems arise in an increased manner when it comes to carrying out relatively long tasks in an environment subjected to vibrations or disturbances, such that, with the help of fatigue, the operator experiences, in the long run, difficulties in perfectly positioning his fingers on an area of the interface to be manipulated.

These ergonomic problems also arise in an increased manner when the interface is a touch surface allowing to drive the displacement of a pointer on a screen as well as the selection of a control area of the display.

Solving ergonomic problems involves taking into account the space constraints available for the installation of the tactile control interfaces.

This is particularly the case in the aircraft cockpits which are equipped with a very large number of interfaces of various kinds and in which it is difficult to implant interfaces in available locations.

DISCLOSURE OF THE INVENTION

The aim of the invention is therefore to overcome the various aforementioned drawbacks and to allow an implantation of a tactile control interface which is ergonomic and which is easily accessible.

In the light of the above, the object of the invention is a tactile interface comprising a touch pad and a support, the touch pad being hingedly fastened on the support between a deployed active position and a retracted inactive position in which the pad is folded back towards the support.

The support constitutes a drawer which is movable in a casing between a pulled-out position in which the interface is in the active position and an inserted position in which the interface is in the retracted position.

Advantageously, the pad comprises a hinge comprising a hinge axis transverse relative to the direction of displacement of the drawer.

In one embodiment, the interface includes a button control pad, disposed upstream of the touch pad, by considering the direction of displacement of the drawer.

The interface may include releasable means for blocking the touch pad in the deployed position.

It may further include at least one member for unlocking the touch pad blocking means.

Advantageously, the interface is provided with a bearing surface for the user's hand, said bearing surface being hingedly fastened relative to the touch pad.

In one embodiment, the bearing surface comprises an anterior hinge by which said bearing surface is hinged on the touch pad and a posterior end sliding relative to the support.

Preferably, the bearing surface includes a sensor for detecting the hand of a user.

In an advantageous embodiment, the touch pad includes a touch bearing surface with a convex outer profile.

According to one feature of the interface, the touch pad comprises two arrays of electrically conductive tracks which are separated and electrically insulated by a substrate comprising a hollow shell with a convex outer profile and which is electrically insulating, the arrays of tracks being internally and externally disposed, respectively.

The invention also relates to an aircraft cockpit seat, characterised in that it includes a tactile interface as defined above, mounted in at least one of the armrests of the seat.

BRIEF DESCRIPTION OF THE DRAWINGS

The invention will be better understood from a detailed study of a few embodiments taken by way of non-limiting examples and illustrated by the appended drawings, in which:

FIG. 1 and

FIG. 2 represent a perspective view of a tactile control interface in accordance with the invention, respectively in the deployed active position and in the retracted inactive position;

FIG. 3 is a profile block diagram of the tactile interface of FIG. 1;

FIG. 4 illustrates the tactile control interface according to the invention, during the use thereof;

FIG. 5 represents the networks of electrical tracks of the touch pad; and

FIG. 6 illustrates an aircraft cockpit seat with a retractable tactile interface in accordance with the invention, in the retracted position.

DETAILED DESCRIPTION

In FIGS. 1 and 2, a tactile control interface is represented according to the invention, designated by the general reference numeral 1.

This tactile interface 1 is in particular intended to be mounted in an aircraft, in the cockpit, and constitutes a pointing device, of the mouse or "pad" type, in order to control the displacement of a pointer on a screen, and if necessary, activate an avionics function.

It is in particular intended to be implanted in the seat of a technical flight personnel or TFP for example in the armrest of a cockpit seat, and is likely to adopt a fully deployed configuration, shown in FIG. 1, and a fully retracted position in the armrest (FIG. 2).

The interface 1 includes a support 2, a touch pad 3 hinged on the support, a bearing surface 4 hinged on the touch pad 3 and a fixed casing 5 which is intended to be fastened in the armrest.

The assembly consisting of the support 2, the touch pad 3 and the bearing surface 4 constitutes a movable drawer 6 which is slidably mounted in the casing 5 between a deployed active position, in which the movable drawer 6 extends outside the casing and a retracted inactive position in which the movable drawer 6 is fully housed in the casing 5, for example by providing in the support and in the casing a slider mechanism, a rack mechanism, or any other equivalent mechanism.

The hinge axis I-I of the touch pad 3 relative to the support and the hinge axis II-II of the bearing surface 4 relative to the touch pad 3 each extend perpendicular to the direction X-X' of displacement of the movable drawer 6.

The touch pad 3 and the bearing surface 4 each have a rectangular or square shape.

Considering the direction D of displacement of the movable drawer in the opening direction, the hinge axis I-I of the touch pad is located along the anterior side 7 of the touch pad, and the hinge axis II-II of the bearing surface 4 is located along the posterior side 8 of the touch pad 3 and along the anterior side 9 of the bearing surface 4.

The posterior side 10 of the bearing surface 4 is for its part slidably mounted on the support 2, for example by means of a slider and slider-crank mechanism, a rack mechanism or any other equivalent device.

Of course, according to the desired configurations, the posterior side 10 of the bearing surface can also be provided with a hinge relative to the support 2 and the anterior side 7 of the touch pad can be slidably mounted relative to the support.

However, preferably, the anterior side 7 of the touch pad is hinged relative to the support 2, while the posterior side 10 of the bearing surface is slidably mounted. However, the mechanism ensuring the sliding mounting on the posterior side of the bearing surface 4 can be provided with a hinge relative to the support in order to allow a change in the angle formed between the bearing surface and the support during the displacement of the movable drawer. Likewise, the anterior side of the touch pad hinged relative to the support can be mounted in a sliding manner relative to the support.

Advantageously, as represented, on the anterior side, the support can be provided with a control pad 11 with control buttons 12 which can be actuated manually to acknowledge a selection made by means of the touch pad.

In the illustrated example, the support is provided with a control pad comprising four control buttons. Of course, the number of control buttons 12 is purely illustrative.

The tactile interface 1 is completed by releasable means 13 for blocking the touch pad 3 in the deployed position. As represented, these means 13 act on the posterior lateral side of the bearing surface 4 so as to block the sliding movement of this posterior end. It can be any appropriate locking means. For example, it may be a pin which is inserted into a lumen provided laterally in the bearing surface 4, a lumen formed in the support, in which an axis carried by the posterior side of the bearing surface 4 is engaged, a brake, of a member for blocking the rack mechanism . . . .

Releasable means 14 for locking the movable drawer 6 are also provided to block the drawer 6 in the deployed position. This is for example means similar to the previously described means 13, for example, a pin carried by the casing 5 which is inserted into a lumen made on the support 2, a lumen made in the casing 5 in which an axis carried by the support 2 is engaged, a brake, or a member for blocking the rack mechanism.

Finally, a member 15 for unlocking the releasable means 13 and 14 is provided to unlock, on the one hand, the touch pad 3 and, on the other hand, the movable drawer 6.

It may be a single button acting simultaneously on the two blocking means 13 and 14 or two specific buttons acting respectively on the means for blocking the touch pad 3 and on the means 14 for blocking the movable drawer 6.

As previously indicated, the touch pad 3 and the bearing surface 4 are mounted on the support so as to adopt a deployed active position shown in FIG. 1, and a retracted inactive position in which the pad 3 and the bearing surface 4 bear against a housing provided for this purpose in the support.

In the deployed active position, the angle formed by the touch pad 3 and for example in the range of 20°.

With reference to FIG. 4, in the deployed active position, the bearing surface 4 is intended to receive the palm of the hand of a user, in the anatomical position of the hand.

In this position, the fingers rest on the touch pad and the control buttons 11 are also accessible without effort.

Advantageously, the tactile interface 4 is provided with a sensor 16 capable of detecting the user's hand and activating the touch pad 3, the latter being inactive as long as the user's hand has not been detected.

As represented, the touch pad 3 advantageously includes an active surface with a convex outer profile having several directions of curvature, preferably with semi-spherical convexity, and constitutes a particularly ergonomic pad for the user, in particular for use with one hand.

The touch surface of the pad constitutes a capacitive touch surface.

It includes for example at least two networks of electrically conductive tracks, formed for example of copper filaments separated by a substrate.

These tracks form an array of electrically charged conductors capable of detecting the bearing of one or more fingers of an operator resulting from a transfer of charges generated by this bearing.

The inner 17 and outer 18 electrical tracks may include a flexible printed circuit substrate 19 of the "PCB" type (for "Printed Circuit Board") made of polyamides.

The substrate 19 is made of a rigid material including plastic, glass or epoxy resin. It is produced by molding, by additive manufacturing or by machining.

The substrate 19 constitutes a hollow shell of convex outer shape, of a shape which is identical or similar to that of the touch surface, and made of an electrically insulating material.

In particular, the shell essentially includes a semi-spherical portion. The semi-spherical shape of the shell and the touch surface of the pad allows the touch surface to be reached by all fingers of one hand resting the wrist on the pad without wrist movement, thus ensuring a better monitoring of the control movements made by the user. A semi-spherical shape is also advantageous in terms of compactness, the spread of the pad being reduced for the same amount of control points on the touch surface.

The two arrays 17, 18 are disposed internally and externally on the convex shell. Thus, the arrays 17, 18 are separated and electrically insulated by the substrate 19.

The inner 17 and outer 18 tracks form conductive matrices or arrays, that is to say, generally parallel disjointed alignments of electrical paths. Furthermore, the inner 17 and outer 18 tracks regularly pass through the substrate 19 and overlap each other at a plurality of overlap points 20.

For example, the inner track 17 passes through passages provided in the substrate, a filament passing through the shell and overlapping the outer electrical track 18 without electrical contact therewith.

A touch capacitive surface is thus formed around the substrate 19 used as a dielectric and matching the curved shape of the substrate 19.

The tracks 17, 18 can each include filaments which are further braided without contacting each other. The filaments thus cooperate to ensure a mechanical and electrical connection, forming a touch flat cable of the pad.

Furthermore, the inner and outer matrices can each include several electrical tracks, so as to achieve a multi-point tactile interface, that is to say being able to be controlled simultaneously by several fingers or control styluses from the same touch surface.

The interface 1 moreover includes means for measuring electrical variables of the inner 17 and outer 18 electrical tracks and may comprise several measuring elements.

Preferably, the interface includes at least as many measuring elements as there are electrical tracks to be analysed to determine the location of a control finger or stylus on the touch surface.

Several tracks can be provided for the same substrate 19 used in the touch surface. In particular, different embodiments of inner and outer matrices and their overlaps 20 as previously described can be combined to produce a convex shell.

These tracks form an array of electrically charged conductors capable of detecting the bearing of one or more fingers of an operator resulting from a transfer of charges generated by this support.

Finally, with reference to FIG. 6, as previously indicated, the tactile interface can advantageously be integrated into the armrest of a capital S seat of an airplane cockpit.

The invention claimed is:

1. A tactile interface comprising: a touch pad and a support, the touch pad being hingedly fastened on the support between a deployed active position and a retracted inactive position in which the pad is folded back towards the support, wherein the support constitutes a drawer which is movable in a casing between a pulled-out position in which the interface is in the active position and an inserted position in which the interface is in the retracted position, wherein the touch pad comprises a hinge comprising a hinge axis transverse relative to the direction of displacement of the drawer, the tactile interface further comprising a bearing surface for the user's hand, said surface being hingedly fastened relative to the touch pad.

2. The tactile interface according to claim 1, further comprising a button control pad, disposed upstream of the touch pad, by considering the direction of displacement of the drawer.

3. The tactile interface according to claim 1, comprising releasable means for blocking the touch pad in the deployed position.

4. The tactile interface according to claim 3, comprising at least one member for unlocking the touch pad releasable means.

5. The tactile interface according to claim 1, wherein the bearing surface comprises an anterior hinge by which said bearing surface is hinged on the touch pad and a posterior end sliding relative to the support.

6. The tactile interface according to claim 5, wherein the bearing surface includes a sensor for detecting the hand of a user.

7. The tactile interface according to claim 1, wherein the touch pad includes a touch bearing surface with a convex outer profile.

8. The tactile interface according to claim 7, wherein the touch pad comprises two arrays of electrically conductive tracks which are separated and electrically insulated by a substrate comprising a hollow shell with a convex outer profile and which is electrically insulating, the arrays of tracks being internally and externally disposed, respectively.

9. An aircraft cockpit seat, comprising a tactile interface according to claim 1, the tactile interface configured to be mounted in an armrest of the seat.

* * * * *